FIG. 1

March 30, 1965     S. L. EHRLICH ETAL     3,176,262

DIRECTIONAL SONAR SYSTEMS

Filed April 6, 1960     9 Sheets-Sheet 2

INVENTOR
STANLEY L. EHRLICH
PAUL D. FRELICH

BY Melvin E. Frederick

ATTORNEY

March 30, 1965  S. L. EHRLICH ETAL  3,176,262
DIRECTIONAL SONAR SYSTEMS
Filed April 6, 1960  9 Sheets-Sheet 3

OMNIDIRECTIONAL

E.W (RELATIVE)

N.S.(RELATIVE)

INVENTOR
STANLEY L. EHRLICH
PAUL D. FRELICH
BY Melvin E. Frederick
ATTORNEY

March 30, 1965  S. L. EHRLICH ETAL  3,176,262
DIRECTIONAL SONAR SYSTEMS
Filed April 6, 1960  9 Sheets-Sheet 6

FIG. 10

INVENTOR
STANLEY L. EHRLICH
PAUL D. FRELICH
BY Melvin E. Frederick
ATTORNEY

FIG. 13

INVENTOR
STANLEY L. EHRLICH
PAUL D. FRELICH
BY Melvin E. Frederick
ATTORNEY

FIG. 14

United States Patent Office 3,176,262
Patented Mar. 30, 1965

3,176,262
DIRECTIONAL SONAR SYSTEMS
Stanley L. Ehrlich, Waltham, and Paul D. Frelich, Wellesley, Mass., assignors to Raytheon Company, Lexington, Mass., a corporation of Delaware
Filed Apr. 6, 1960, Ser. No. 20,444
15 Claims. (Cl. 340—3)

This invention relates to underwater detection of submerged objects wherein range and direction is determined and more particularly to lightweight directional underwater detection apparatus having a plurality of modes of operation and an essentially infinite search rate.

The invention, which is especially useful as a lightweight high-scan-rate system having good bearing accuracy, was developed for use with small helicopters and will be described in this connection to facilitate explanation and understanding of the invention. However, it should be expressly understood that the invention is not so limited and that various changes, modifications, and substitutions may be made and that the invention is equally applicable in conjunction with other vehicles and embodiments without departing from the underlying essentials involved and without exceeding the scope of the appended claims directed thereto.

As pointed out hereinabove, the principal object of the invention is the provision of a helicopter-dipped sonar system that is lighter in weight and that has a higher (essentially infinite) scanning rate than that heretofore available.

It is well known that helicopters can traverse large distances at comparatively high speed, and are capable of a high search rate. To maintain equipment weight at a minimum, present day helicopter-borne detection systems are designed as a searchlight sonar. Because of the inherent operating characteristics of searchlight-type sonar, the helicopter when searching is required to hover at one point until a 360 degree scan in azimuth is completed. Previous attempts to reduce this inefficient use of available endurance have been thwarted to varying degrees primarily by difficulties encountered in keeping the weight of high-scan-rate equipment within acceptable limitations. Further, the amount of cable that can be used with present day helicopter-borne sonar sets is limited due to the overall weight of the equipment, the weight of the transducer, and the size of the cable required. For these reasons the maximum limit to which the transducer may be submerged is severely limited. This is particularly disadvantageous due to the increased operating depths of present day submarines and the increased maximum depths to which they can descend.

This invention utilizes a transducer technique which, although based on well-founded concepts of wave theory, provides a unique lightweight multimode transducer and associated circuitry having a substantially infinite scan rate and a video bearing accuracy of about ±4.5 degrees for long range detection. All values of azimuth are determined concurrently by phasing the elements of the single, relatively lightweight transducer and time sharing in the receiving and indicating circuits is eliminated. In the passive or listening mode conversion of plane-wave signals into multiple transducer modes which are received simultaneously permits instantaneous, directional, passive listening with 360 degrees coverage without conventional mechanical or electronic scanning. This effectively infinite scan rate results in a greatly increased search rate in the echo-ranging or active mode. Further, by reason of the substantially reduced weight of the entire system greater helicopter range and maneuverability is possible and with the substantially lighter transducer or sea unit a longer cable can be provided for increased submergence depth of, for example, up to at least 450 feet which gives access to the longer range detection capability that exists below the now well-known thermal-gradient layer. Still further, to meet modern anti-submarine warfare requirements, means having a wider bandwidth than that heretofore possible may be used to permit tracking of high speed submarines and selectable echo-ranging frequencies and a communication channel is provided to permit a plurality of searching vehicles such as helicopters to operate as a team on a common search mission.

Bearing information is presented in the form of a radial line on a cathode ray tube and also from multitone headsets. Range is permanently recorded on a medium such as paper by a suitable recorder and at the operator's option, reverberation and echoes from slow-moving targets, or from targets concentrated in any one of four quadrants, may be rejected.

The above-mentioned features and advantages may be obtained by the preferred form as herein illustrated and hereinafter more completely described. Described briefly in terms of the preferred form, the improved system comprises a sea unit having an oil-filled portion housing the transducer and an air-filled portion housing a gyro compass, depth detector, transducer preamplifiers, and a combining network. The transducer in combination with the preamplifiers and the combining network give simultaneously two dipole patterns with mutually substantially perpendicular acoustic axes and a phase reference omnidirectional pattern. A broadband phase shifter shifts the signal from the omnidirectional pattern by 90 degrees. A servo assembly including a gyro compass and a servo-positioned true-bearing resolver combines the dipole or directional signals from the dipole patterns with compass information in a form compatible with the directional signals to resolve the directional signals into true-bearing form before these signals are further processed. The two directional signals in true-bearing form (an EW signal and an NS signal) and the phase shifted Omni signal are amplified in a three channel pilot tone network which includes three matched amplifiers with gain control. TVG (time varied gain) control is actuated from a keying circuit during the echo-ranging mode, AGC (automatic gain control) is derived from the output of the Omni channel and manual gain control may also be provided for use during the communication and listening modes. Although the function of the pilot tone network is to compress the 90-db range of received signals to the substantially reduced dynamic range of the video indicator such as, for example, 20-db, each of the three channels of the pilot tone network are also provided with two separate pass bands, one being at the signal frequency band and the other being at the pilot tone band. The gain control circuit provides a high flatness factor of not less than 20 and preferably about 50, where flatness factor is defined as the ratio of the pilot tone network input level change in decibels to the output level change in decibels. A pilot tone oscillator and amplitude compressor circuit is used in conjunction with the pilot tone amplifiers to maintain bearing accuracy and to compress the pilot tone output level over a range of about 100 db. The compressor circuit is actuated by a suitable voltage initiated by the keying circuit and a portion of the output of the compressor circuit is supplied to an input of the amplifier in each pilot tone channel. Since the gain control input signals to the three channels are common and the output signals are substantially equal and vary over approximately a range of only 0 to 2 db while the input signals to each channel will vary over a range of about 0 to 100 db there will be a maximum "$g_m$" change in each channel of about 98 db.

Therefore, the gain of the signal pass band will vary 98 db in each channel when the level of the pilot tone input signal varies 100 db. If it is assumed that for the same gain control bias applied to the three channels a tracking error of 5 db exists, then a flatness factor of about 50 of the pilot tone network reduces this error to .1 db.

A video bearing indicator comprising a small diameter cathode ray oscilloscope with electromagnetic deflection provides a three-dimensional presentation with the NS directional signal controlling vertical deflection, the EW directional signal controlling horizontal deflection, and the phase shifted Omni signal controlling brightness to provide bearing sense since the NS and EW signals alone will provide an ambiguous presentation. Thus, the presentation of a received signal will be a radius vector extending outwardly from the center of the cathode ray tube. The presentation and orientation of the radius vector indicating the presence of a target and target bearing from true north where true north is at the top of the indicator for true bearing presentation. The magnitude of the radius vector, exclusive of TVG and AGC effects, will be proportional to the strength of the received signal.

A communication signal circuit having an upper sideband, suppressed-carrier output is provided to allow the operator or others to choose to communicate either on an intercommunication system or through the transducer on a single sideband channel, or both simultaneously.

An audio receiver indicator circuit for complementing the range recorder and video bearing indicator includes three cardioid summing circuits, a normal-blanked switch, a blanked sector selector switch, a sector-blanking mixer, for multitone mixers and two headphone amplifiers. The function of two summers is to produce four cardioid directivity patterns by properly combining the phase shifted Omni signal and a directional signal in true bearing form. The output signals of the aforementioned two cardioid summers are four cardioid patterns, each of which has a maximum response in one of the cardinal compass directions and a minimum response in the opposite direction. The Omni signal is supplied to the third summer, the output signal of which may be supplied to the sector-blanking mixer as is also the case with the output signals of the other two summers. The sector blanking mixer serves as an audio mixer for the passive mode and communication and also as a range recorder adapter. The desired signal from the summing circuits is selected by the normal-blanking and blanked sector selector switches. The input signals of the multitone mixers comprises N, E, S and W signals from the summers having respectively a maximum response in the north, east, south and west direction. The N and E signals are combined and supplied through an audio amplifier to the right earphones and the S and W signals are combined and supplied through an audio amplifier to the left earphones.

Such a system has an infinite rate of scan and multiple operating modes combined with the additional advantages of simplicity, compactness, and lightweight, suiting it particularly well for ultrasonic underwater detection by helicopters. By having certain parts or circuit components serve novel and multiple duty, the invention reduces the number of potential trouble points and thereby increases the reliability of operation and simplifies maintenance problems in such systems. When an all transistor system is used the total weight of the system may be held to about 250 pounds or less.

The foregoing and other features, objects and advantages of the invention including certain details more completely described hereinafter relating to the preferred form will become more fully evident from the following description and the accompanying drawings wherein.

Figure 1:
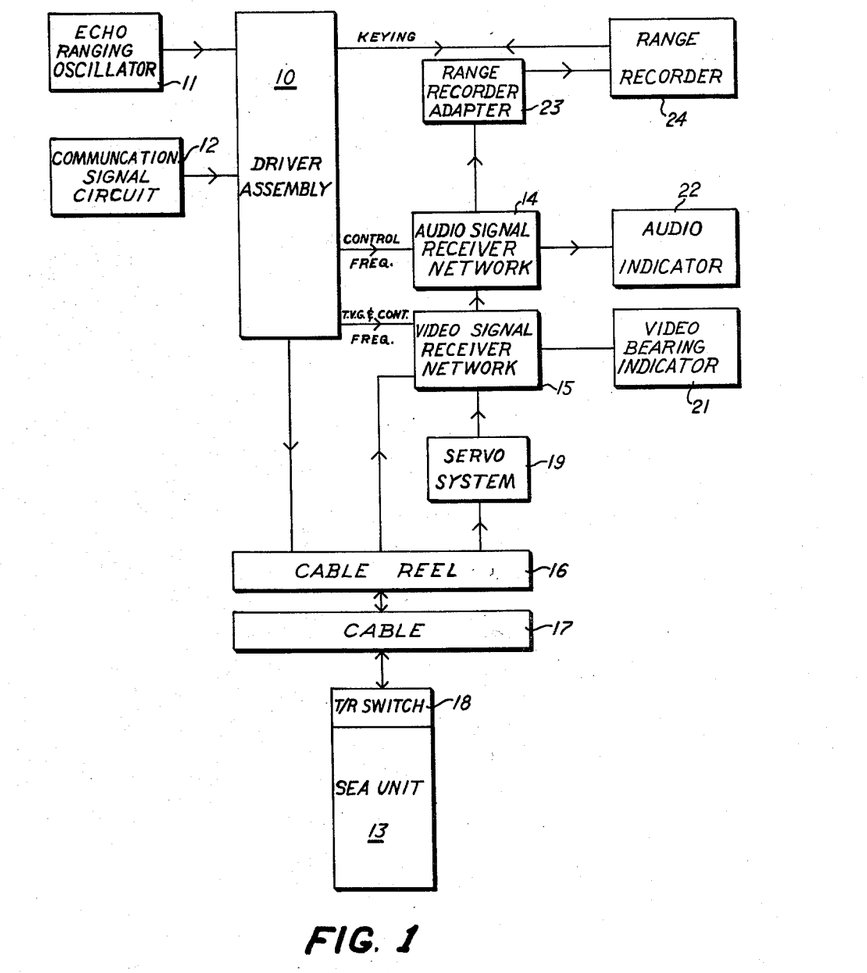
FIG. 1 is a block diagram of the invention.
Figure 8:
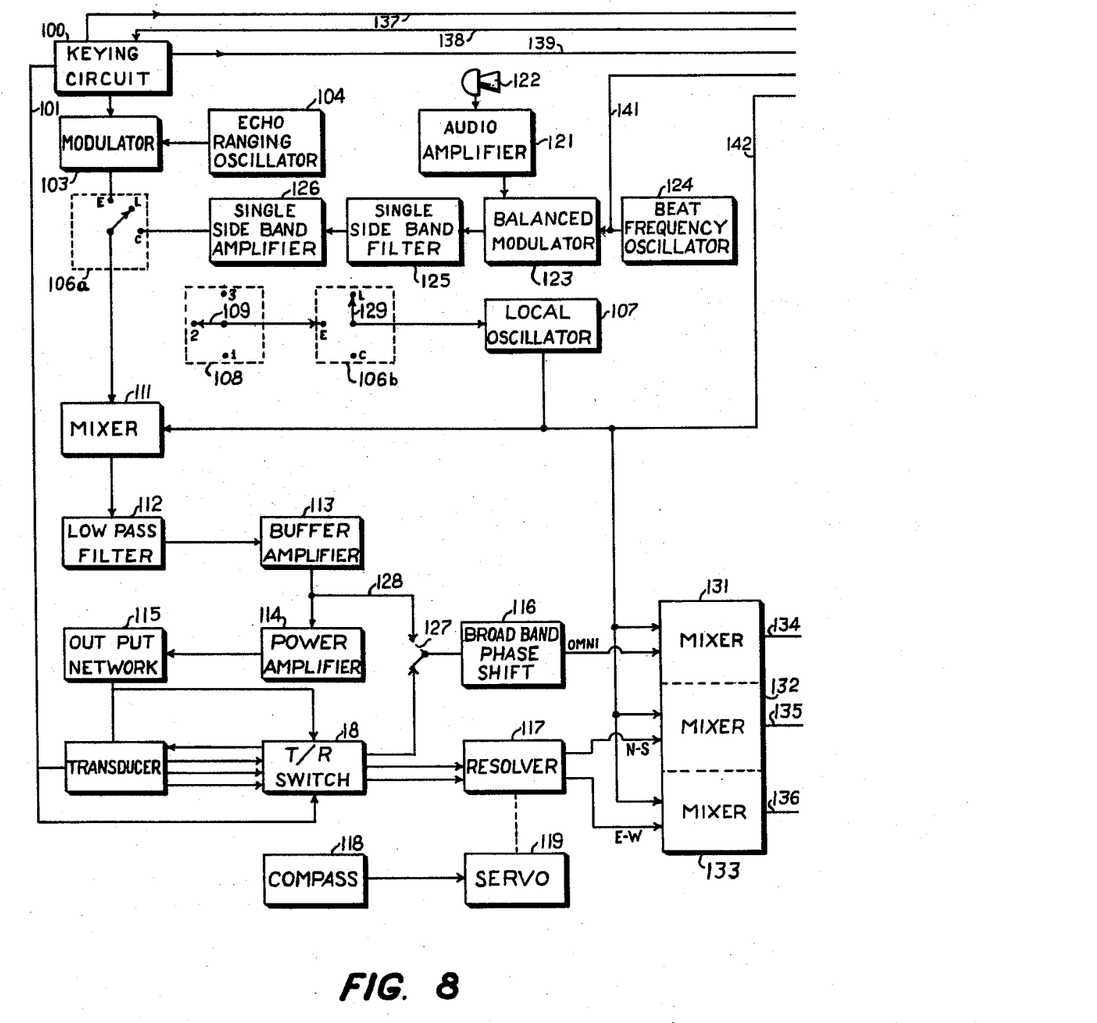
FIGS. 8, 9 and 10 when placed side by side in consecutive order form in greater detail than that of FIG. 1 a block diagram of the electrical aspects of the system.
Figure 9:
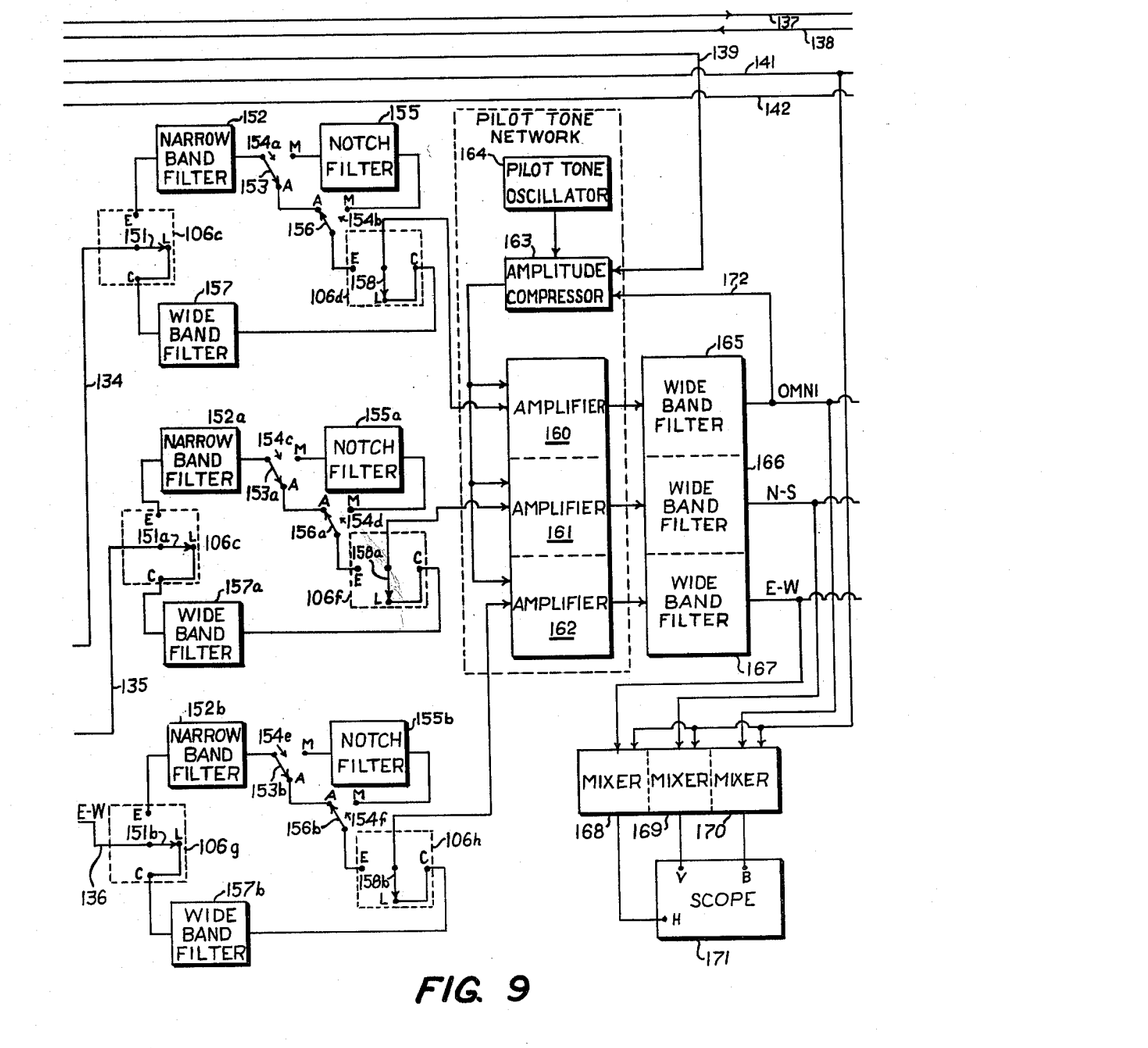
Figure 10:
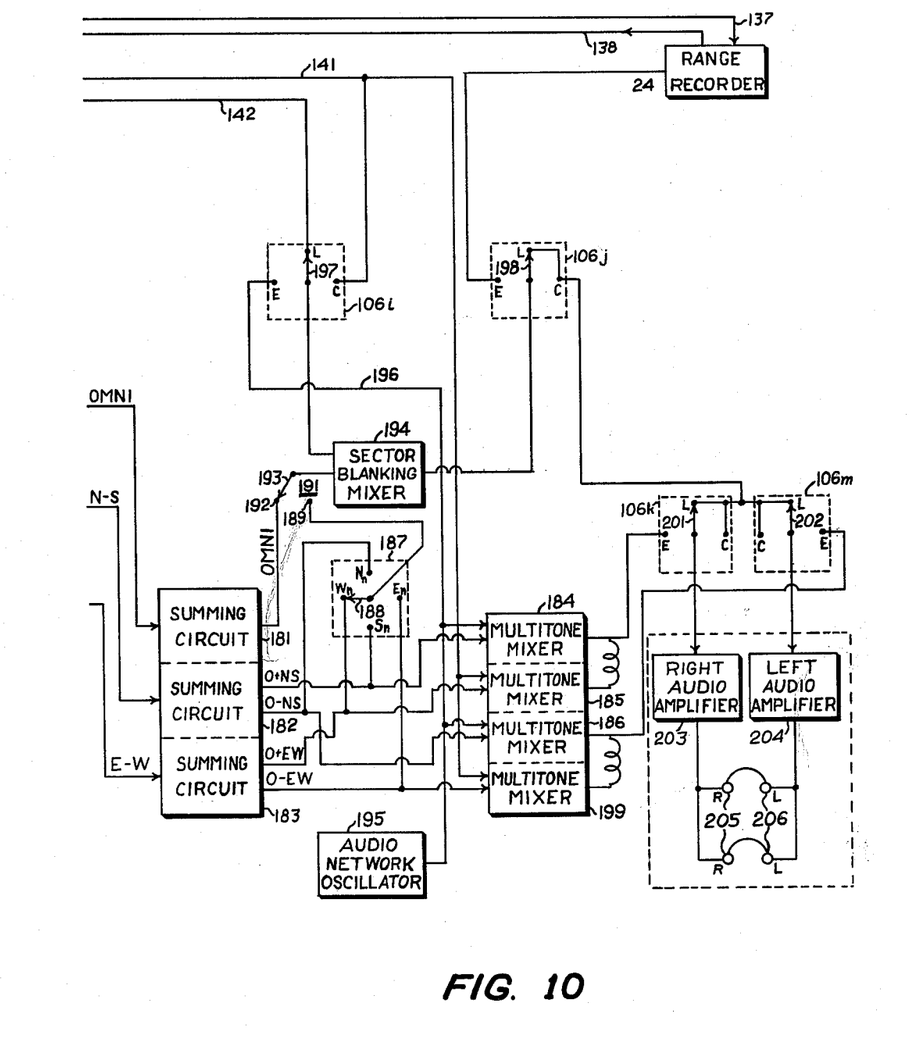

A highly simplified block diagram of the system adapted for use with helicopters is shown in FIG. 1 as an aid in understanding the invention and the following discussion thereof is intended as an introduction to the more complete discussion in connection with FIGS. 8, 9 and 10 which more completely show the invention in block form. Broadly, as shown in FIG. 1, the system includes a driver assembly 10, more thoroughly discussed hereinafter, for performing necessary keying operations, receiving and supplying to the transducer in the sea unit 13 a carrier frequency from an echo-ranging oscillator 11 and audio signals from a communication circuit 12 supplying control frequencies to both the audio signal receiver network 14 and the video signal receiver network 15, and a TVG (time varied gain) control signal to the video signal receiver network 15. The carrier signal for echo ranging is supplied from the driver assembly 10 to the transducer in the sea unit 13 through a cable reel 16, cable 17 and a T/R (transmit-receive) switch 18. The T/R switch 18, responsive to a keying signal connects the transducer to the proper conductors in the cable 17 for transmitting and receiving operations. The transducer more thoroughly described hereinafter provides two dipole patterns with acoustic axes at right angles and an omnidirectional pattern. The T/R switch 18 connects the carrier signal from the driver assembly 10 to the omnidirectional pattern during transmission, and during reception connects the signal from the omnidirectional pattern to the video receiver network 15 and the signals from the dipole patterns to a servo system 19 for resolving the dipole signals (in relative form) to true-bearing form which are then in turn supplied to the video signal receiver network 15. The servo system 19 is responsive to a gyro compass located in the sea unit 13 and as mentioned immediately hereinabove the servo system resolves the signals in relative form from the dipole patterns to true-bearing form. The omnidirectional signal is phase shifted 90 degrees and in combination with the dipole signals in true-bearing form comprises the essential input signals to the video signal receiver network 15. The video signal receiver network 15 comprises essentially three filter and gain controlled amplifier channels with reverberation control circuitry. The function of the reverberation control circuitry is to adjust amplification in accordance with reverberation and to insure that the amplifiers for the true-bearing signals track one with another to prevent or minimize bearing errors. The output signals of the video signal receiver network 15, amplified to compensate for reverberation and to prevent errors due to unequal amplification of the dipole signals in true bearing form are supplied to a video-bearing indicator 21 or cathode ray oscilloscope to indicate target bearing. The dipole signals are connected to the vertical and horizontal deflection means of the cathode ray tube and the phase shifted omnidirectional signal is connected to the brightness control of the cathode ray tube to provide bearing sense. A portion of the output signals of the video signal receiver network 15 is supplied to the audio signal receiver network 14 which by means of three summing circuits provides four cardioid pattern output signals. These cardioid pattern output signals are supplied to an audio indicator 22 comprising audio means such as, for example, a set of binaural earphones in such a manner as to produce, as a supplement to the video-bearing indicator means 21, different audio signals in a different earphone corresponding to the general bearing of a target. Means are also provided in the audio signal receiver network whereby the aforementioned cardioid signals may be selectively used to suppress indications of a target in any one of four quadrants. The range recorder adapter 23, which is a mixer, receives signals from the audio signal receiver network 14 and supplies them in suitable form to a range recorder 24 wherein the range of targets is permanently recorded in conventional manner.

Figure 2:
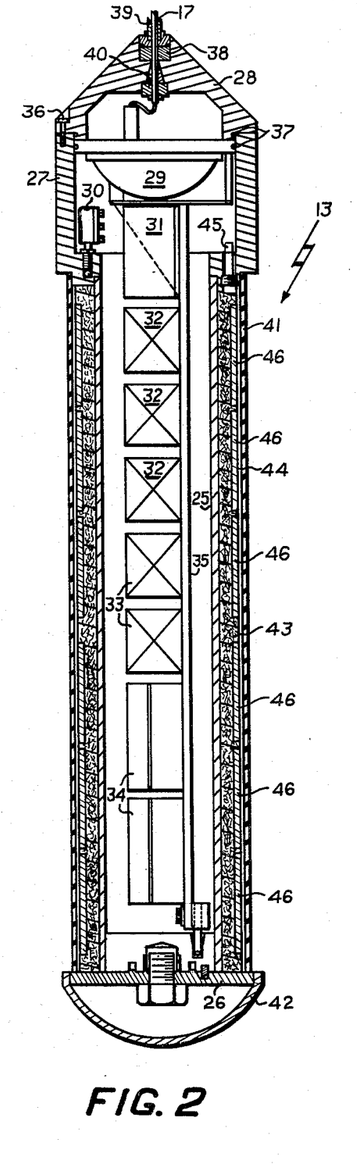
FIG. 2 is a sectional view of the sea unit containing the gyro compass and transducer and associated circuitry.

With reference now to FIG. 2 which shows the structural features of the sea unit 13 in detail, the sea unit 13 hangs in a vertical position at the end of the load-bearing cable 17 for sonar operation. As shown in FIG. 2, the sea unit is comprised of a rigid center tube 25 having a lower-end fitting 26 sealably attached to its lower end, an upper cylindrical portion 27 sealably attached to its upper end, and an upper-end fitting 28 removably and sealably attached to the upper end of the cylindrical portion 27 to form an air-filled and water tight compartment. Contained within this compartment is a gyro compass 29, a depth detector 30, and certain portions of the circuitry associated with the transducer such as, for example, preamplifiers 31, matching transformers 32, relays 33, and tuning coils 34 hereinafter more completely described in connection with FIG. 7. The aforementioned components are mounted on a removable base or frame 35 which extends substantially the length of the sea unit. The upper cylindrical portion 27 which contains the gyro compass 29 and a suitable depth detector 30 is fixedly attached to the center tube 25 such as by welding or the like, and the upper end fitting 28 is removably attached to the upper cylindrical portion by bolts 36 or the like. O rings 37 provide, respectively, a primary and secondary water tight seal at the junction of the end fitting 28 and cylindrical portion 27. Conventional cable sealing means of a type well known in the art, such as, for example, a compressible element 38 and means 39 to compress this element to form a water tight seal in a conventional manner provide a primary water tight seal in combination with a load-bearing seal 40 at the cable 17. The upper end fitting 28 is made removable to facilitate assembly and maintenance of the transducer and the upper cylindrical portion 27 provides protection for the transducer during lowering and raising operations and supports the transducer boot or acoustic window 41 which covers the transducer active elements. A streamlined cap 42 containing space for weighting the sea unit, if necessary, to obtain a desired sinking rate is provided at the bottom of the sea unit to facilitate water entry.

The active elements of the transducer consist of separate cylindrical barium titanate ($BaTiO_3$) elements acoustically isolated from the center tube 25 and from each other by a suitable pressure release material 43 such as Corprene. The outer surface of the active elements are covered and protected by a boot or acoustic window 41, which is provided with a water tight seal at its ends and is spaced away a short distance from the transducer active elements. The boot 41 is maintained in spaced relationship with the transducer active elements by filling the space 44 therebetween with a suitable oil, such as DC-500 silicon oil. A valve 45 permits oil to be introduced into the space 44 between the active elements and the boot and the electrical leads from the active elements are brought through suitable pressure tight connectors (not shown) to the air filled compartment. It has been found that an operative sea unit may be constructed to have a maximum diameter of six and three-quarter inches, a maximum length of forty-six inches, and a maximum weight of sixty-three pounds. The active elements 46 used in the aforementioned sea unit were six circumferentially polarized cylindrical barium titanate elements axially mounted on the center tube 25. Each of the active elements 46 were three inches high with a five inch outside diameter and a ¼ inch wall. The boot 41, consisting of wrapped neoprene, had a wall thickness of ⅛ inch and an outside diameter of six and three-quarter inches and the center tube 25 had a diameter of about four inches.

Figure 3:
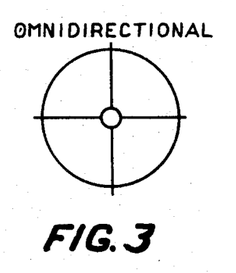
FIGS. 3, 4 and 5 are graphic illustrations showing the patterns provided by the transducer and their relation one with another.
Figure 4:
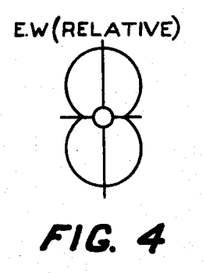
Figure 5:
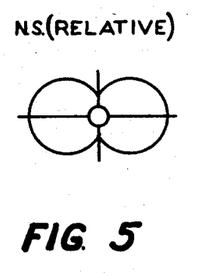

When connected in the manner as described hereinafter, the transducer provides three patterns as shown in FIGS. 3, 4 and 5. These patterns are, respectively, an omni-directional pattern as shown in FIG. 3, an EW (relative) dipole pattern as shown in FIG. 4, and a NS (relative) dipole pattern as shown in FIG. 5, the acoustic axes of the EW pattern being substantially at right angles to those of the NS pattern.

Figure 6:
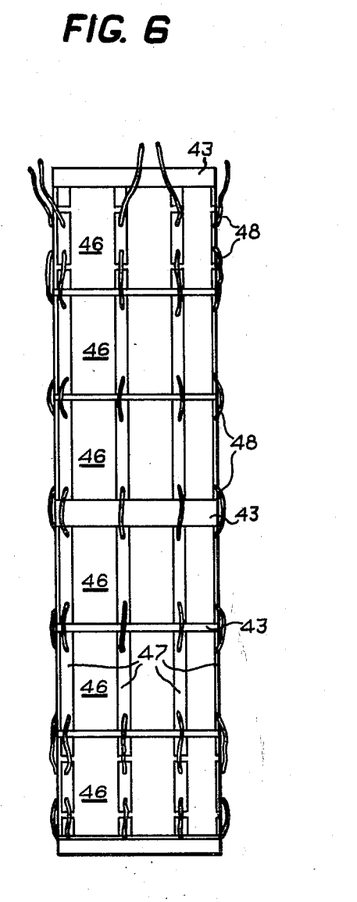
FIG. 6 is a side view showing the cylindrical transducer located in the sea unit.

The transducer active elements 46 are more clearly shown in FIG. 6 where they comprise a cylindrical barium titanate line transducer consisting of six cylindrical active elements 46 axially mounted on the center tube 25 and acoustically isolated therefrom and from each other by suitable pressure release material 43. Each active element is provided with a plurality of electrodes 47 on their outer surfaces formed, for example, by depositing thereon a conductive material in strip form at equally spaced intervals. For the embodiment shown and described, eight electrodes are provided although it is to be understood that the patterns may be formed with a greater or even a lesser number of electrodes. The two end active elements have about half of each electrode formed thereon removed to provide shading for rejection of noise along the longitudinal axis of the transducer such as, for example, helicopter noise. The electrodes 47 of the active elements 46 are aligned one with another upon assembly on the center tube 25 and the longitudinally adjacent electrodes on each element are electrically connected by conductors 48 to form eight continuous parallel and axial electrodes certain ones of which are connected to four windings of a transformer shown in detail in FIG. 7. It has been found that dipole patterns with a sufficient null depth of about 20 db are obtained if all four quadrants of the transducer are used to form the beam. It is more difficult to achieve a specified null depth if only two opposite quadrants are used to form the beam. For this reason, a four quadrant scheme for connection of the transducer is used to obtain maximum null depth and uniform polarization of the active elements is necessary for orthogonal null angle separation. Further, in order to insure accurate true bearing indications of targets, the gyro compass must be of the type capable of alignment and must be aligned with the transducer. Upon acoustical alignment of the transducer with an indexing mark on an exposed surface of the sea unit or, alternately, the determination of the location of the indexing mark on the basis of the acoustic characteristics of the transducer, the alignment thereafter of the gyro compass with this mark insures that the subsequent conversion of the electrical signals in relative form from the transducer to true bearing form will consistently provide accurate (magnetic) true bearing information of targets irrespective of the instantaneous position of the transducer.

Figure 7:
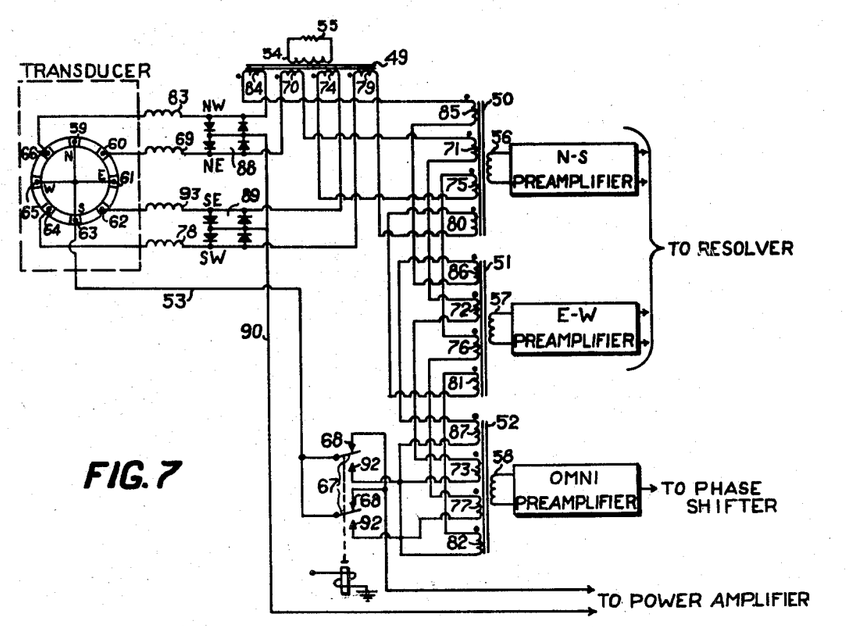
FIG. 7 is a schematic diagram partly in block from of the transducer.

Bearing angle determination is provided by the transducer, the combining network associated therewith, and a 90 degree phase shifter hereinafter described. As will become more apparent hereinafter, four basic signals are available from the transducer. These four basic signals, which are in relative form, are indicated in FIG. 7 as NW, NE, SE, and SW. Three pattern voltages which comprise the utilized output voltages of the transducer and a reference ground are obtained from the aforementioned four basic signals. The three pattern voltages are identified in FIG. 7 as NS, EW, and Omni. The provision of the three pattern voltages and the reference ground from the four basic signals may be shown mathematically in the following manner:

| Signal | Voltage |
| --- | --- |
| NE | $\Sigma_\omega \left[ j\frac{R}{4} + \frac{C}{4}(\cos\beta + \sin\beta) \right] e^{j\omega t}$ |
| SE | $\Sigma_\omega \left[ j\frac{R}{4} + \frac{C}{4}(-\cos\beta + \sin\beta) \right] e^{j\omega t}$ |
| SW | $\Sigma_\omega \left[ j\frac{R}{4} + \frac{C}{4}(-\cos\beta - \sin\beta) \right] e^{j\omega t}$ |
| NW | $\Sigma_\omega \left[ j\frac{R}{4} + \frac{C}{4}(\cos\beta - \sin\beta) \right] e^{j\omega t}$ |
| NS, combined | $(NE+NW)-(SE+SW) = \Sigma_\omega C \cos\beta e^{j\omega t}$ |
| EW, combined | $(NE+SE)-(NW+SW) = \Sigma_\omega C \sin\beta e^{j\omega t}$ |
| Omni | $(NE+SE)+(SW+NW) = \Sigma_\omega j R e^{j\omega t}$ |
| Ground | $(NE+SW)-(NW+SE) = 0$ | where $\beta$ is the bearing angle, R is the response of the radial mode at the circular frequency $\omega$ and C is the response of the circumferential mode at the circular frequency $\omega$.

With particular reference now to FIG. 7, which shows the transducer and combining network comprising four transformers in schematic form and the NS, EW, and Omni pattern voltage preamplifiers in block form, four summing transformers 49, 50, 51, 52, each with four input windings and one output winding, are utilized to provide the three pattern voltages referred to hereinabove. The transducer is shown with eight electrodes and the voltages at each of the electrodes are arbitrarily identified as N, NE, E, SE, S, SW, W, and NW. The N, S, E, and W voltages are connected to a common high voltage conductor 53 from the power amplifier forming a part of the driver assembly and a tuning coil is connected in series with each of the four remaining transducer electrodes. The polarity of each input winding of the four transformers 49, 50, 51, 52 is indicated in conventional manner by a dot and it should be noted that the polarity of the windings are all the same one with another but that the manner of connecting the signals thereto vary. The secondary winding 54 of transformer 49 is terminated with a resistive load 55 and the secondary winding 56 of transformer 50 comprises the input to the NS preamplifier, the secondary winding 57 of transformer 51 comprises the input to the EW amplifier and the secondary winding 58 of transformer 52 comprises the input to the Omni preamplifier. The preamplifiers which preferably are transistorized to save space and weight should have a 90 db dynamic range and provide about 45 db of gain. The electrodes of the transducer and the windings of the summing transformers are connected as follows to provide the three pattern voltages (NS, EW, and Omni) defined hereinbefore. Electrodes 59, 61, 63 and 65 are connected to the conductor 53 which is connected through arms 67 and contacts 68 of the T/R switch in its released or unactivated position as shown in FIG. 7 to the high voltage output of the aforementioned power amplifier in the driver assembly 10. The NE signal from electrode 60 may be traced through tuning coil 69, winding 70 of transformer 49, winding 71 of transformer 50, winding 72 of transformer 51 and winding 73 of transformer 52 to the contacts 92 of the T/R switch, which contacts comprise a common junction for the transducer signals. The SE signal from electrode 62 may be traced through tuning coil 93, winding 74 of transformer 49, winding 75 of transformer 50, winding 76 of transformer 51, and winding 77 of transformer 52 to the aforementioned common junction. The SW signal from electrode 64 may be traced through tuning coil 78, winding 79 of transformer 49, winding 80 of transformer 50, winding 81 of transformer 51, and winding 82 of transformer 52 to the common junction. Finally, the NW signal from electrode 66 may be traced through tuning coil 83, winding 84 of transformer 49, winding 85 of transformer 50, winding 86 of transformer 51, and winding 87 of transformer 52, to the common junction. It is important that the aforementioned signals be supplied to the various windings as shown in FIG. 7 to provide the proper summing function in the transformers. When arms 67 of the T/R switch are in their activated position for listening, the common junction, which is to say contacts 92, are connected to conductor 53. It may now be readily apparent to those skilled in the art that the formation and connection of the transducer electrodes, in the manner described hereinbefore and shown in FIG. 7 to the summing transformer windings having the indicated polarities will provide the three pattern voltages, namely, the NS voltage at the output winding 56 of transformer 50, the EW voltage at output winding 57 of transformer 51 and the Omni voltage at the output winding 58 of transformer 52. These pattern voltages, which are in relative form, are each initially amplified by the indicated preamplifiers. The output signals of the NS and EW preamplifiers are supplied through separate conductors in the cable 17 to a resolver hereinafter described and the output signal of the Omni preamplifier is supplied through separate conductors in the cable 17 to a phase shifter also hereinafter described. Transformer 49 functions to balance out the effects of the input windings on the remaining three summing transformers and the two sets of four diodes 88, 89 connected respectively between tuning coils 83, 69 and turning coils 93, 78 function as a switch during transmission. During transmission, the two pairs of oppositely connected diodes 88 provide a short circuit for the NW and NE signals to conductor 90 and the two pairs of oppositely connected diodes 89 provide a short circuit for the SE and SW signals to conductor 90 which is the low voltage line from the power amplifier.

With reference now to FIGS. 8, 9 and 10 the keying circuit 100 of FIG. 8 automatically or manually actuates and in part coordinates the response of the range recorder 24 with transmission. Upon actuation of the keying circuit 100 a trigger pulse therefrom is supplied by line 101 to energize the T/R switch 18 to the transmit position. A pulse length generator forming a part of the keying circuit 100 is also energized and the output signal thereof is supplied to modulator 103 in conjunction with the output signal of the echo-ranging oscillator 104. For the echo-ranging mode only the output signal of modulator 103 is supplied to a mixer 111 through one set of contacts forming one portion of a mode selector switch.

The aforementioned mode selector switch is comprised of 12 portions or sets of three contacts, each having a contact arm ganged to a common shaft. To prevent confusion, the various arms of the mode selector switch have not been shown as being ganged in the drawings, although it is to be understood that such is the case. The various portions of the mode selector switch are indicated by the numeral 106 and subscripts $a$, $b$, $c$, etc. Each portion of the mode selector switch as shown in the drawings has a separate position for echo ranging, listening, and communication indicated on the drawings as respectively E, L, and C. The mode selector switch is shown in the drawings as being in the L position.

Selectable echo-ranging frequencies are made available by reason of the local oscillator 107. The echo-ranging frequency selector switch 108, shown in FIG. 8 as having 3 positions, selectably connects in circuit with the oscillator different crystals (not shown) for determining the frequency of the local oscillator 107. The contact arm 109 of the echo-ranging frequency selector switch 108 is connected to the E position of the mode selector switch portion 106b. When in the L and C positions, the echo-ranging frequency selector switch 108 is open circuited by the mode selector switch portion 106b and separate crystals (not shown) for providing suitable local oscillator frequencies for the listening and communication modes are connectable in circuit with and to control the local oscillator 107 by positions L and C of the mode selector switch 106b. The resultant output signal from the mixer 111 comprising, for example, the carrier frequency is supplied to a filter 112 adjusted to provide the desired bandpass of transmission and is thereafter amplified by the buffer amplifier 113 and power amplifier 114. An output network 115 matches the power amplifier 114 to the cable 17 of FIG. 1.

During reception in the echo-ranging mode or in the listening mode the T/R switch 18 connects the output signals from the omnidirectional pattern to a broadband phase shifter 116 and the signals from the dipole patterns to a resolver 117. Errors due to rotation of the transducer about its longitudinal axis and hence rotation of the dipole patterns are overcome by the servo system 19 referred to hereinbefore comprised of a gyro compass 118 in the sea unit 13, a servo motor 119 responsive to the electrical output signals of the gyro compass 118, and a resolver 117 mechanically responsive to the output of the servo motor 119. Inasmuch as the transducer may and does rotate about its longitudinal axis when submerged the directional information contained in the signals is relative to the instantaneous position of the transducer. This problem is overcome by resolving signals from the dipole patterns in relative form to true-bearing form by means of the servo system 19. The servo motor 119 is responsive to the output signals of the gyro compass 118 and in conventional manner controls the resolver 117 for resolving the relative dipole signals to true-bearing form. As a matter of convenience, the two modified dipole signals will hereinafter be referred to as the NS signal and the EW signal.

The broadband phase shifter 116 delays the signal from the Omni directional pattern by 90 degrees and provides a 6 db rising slope per octave gain characteristic over the entire bandwidth of the system. This is accomplished by use of a flat amplifier preceded by a coupling network which has a small RC product. The coupling network produces the rising slope of 6 db octave and a substantially 90 degree phase shift over the required range with considerable attenuation. A direct coupled amplifier may be utilized to compensate for the attenuation of the coupling network without introducing large amounts of phase shift. The principal consideration, however, in selecting the coupling network is to maintain a nearly constant phase shift over the desired frequency range without having unreasonable attenuation.

The communication signal circuit 12 for providing single sideband communication is comprised of an audio amplifier 121 for receiving audio signals from a microphone 122 rendered operative by a conventional push-to-talk switch, a balanced modulator 123 for receiving and modulating a portion of the output signal from a beat frequency oscillator 124 with the amplified audio signal from the audio amplifier 121, a single sideband filter 125 connected to the output terminal of the balanced modulator 123, and a single sideband amplifier 126 connected between the output terminal of the single sideband filter 125 and the C position of the mode selector switch portion 106a. The single sideband amplifier 126 functions to provide an input impedance which may be used as a termination for the single sideband filter 125 and to bring the output level of the single sideband communication signal circuit 12 up to that of the echo-ranging oscillator 104 so that in either the echo-ranging or communication mode substantially the same power will be supplied to the mixer 111. Switch 127 in line 128 forms part of the aforementioned push-to-talk relay (not shown) and in its actuated position shown in phantom in FIG. 8 supplies a portion of the communication signal at the output terminal of the buffer amplifier 113 to the Omni directional channel to allow the person talking to also be able to hear himself. Switch 127 may be omitted if desired. When the mode selector switch portion 106b, the contact arm 129 of which is connected to the local oscillator 107, is in the C position the local oscillator 107 supplies a suitable frequency to the mixer 111 where it is mixed with the incoming communication signal to provide a communication signal at the output of the mixer 111 having a suitable frequency for transmission and reception.

Returning now to the modified output signals from the transducer, the directional true-bearing NS and EW output signals from the resolver 117 and the phase shifted Omni directional signal from the broadband phase shifter, 116 hereinafter referred to as the Omni signal, together with a portion of the output signal of the local oscillator 107 are supplied respectively to the input terminals of mixers 131, 132, and 133. It is the function of the mixers 131, 132, and 133 in combination with the variable frequency local oscillator 107, for the embodiment shown, to shift the selected frequency of the Omni, NS and EW signals from the transducer to that of the echo-ranging oscillator 104 for example, to facilitate and simplify the design of subsequent circuits and additionally provide improved frequency stability. With reference now to FIG. 9, the frequency and phase-shifted Omni signal from mixer 131 is connected to the contact arm 151 of the mode selector switch 106c portion.

The E position of switch portion 106c is connected to the input terminal of a narrow band filter 152 the output terminal of which is connected to the contact arm 153 of one portion of the target selector switch. The target selector switch is comprised of six portions each having an M position and an A position and a contact arm ganged to a common shaft. The various portions are identified in the drawings by the numeral 154 followed by the subscripts a, b, c, etc. As will be more thoroughly discussed, when the mode selector switch is in the E position and the target selector switch is in the M position only moving targets may be detected and when the target selector switch is in the A position moving as well as stationary targets may be detected. The A position of the target selector switch portions 154a, 154b are tied together and the M positions are connected respectively to the input and output terminals of a notch filter 155. The contact arm 156 of the target selector switch portion 154b is connected to the E position of the mode selector switch portion 106d. The L and C positions of both mode selector switch portions 106c and 106d are tied together and connected respectively to the input and output terminals of a wideband filter 157. The contact arm 158 of mode selector switch portion 106d is connected to the signal input terminal of amplifier section 160 hereinafter to be discussed. The output signals of mixers 132, 133 are each connected to separate filter networks identical to the filter network described immediately hereinabove for the Omni signal. The components of the filter networks connected to the output terminals of mixers 132, 133 are identified in FIG. 9 with the same numerals as used for the Omni directional channel but different subscripts have been added to facilitate reference to and identification of these parts.

The narrow band filters 152, 152a, 152b have a narrow bandpass of, for example, 500 c.p.s. with a center frequency at the frequency of the echo-ranging oscillator 104 while the wideband filters 157, 157a, 157b have a considerably wider bandpass centered at the frequency of the echo-ranging oscillator. The aforementioned wideband filters may have a bandwidth of, for example, 3 kc. to accept the single sideband communication signals. The notch filters 155, 155a, 155b, while having the same bandpass and center frequency as the narrow band filters are provided with a very narrow notch of, for example, about 40 c.p.s. at their center frequency to remove reverberation and indications of stationary targets.

In view of the above discussion and with particular reference to FIG. 9 it may now be obvious to those skilled in the art that when the mode selector switch is in either the L or C position the output signals of each mixer 131, 132, 133 will be supplied respectively to an input terminal of amplifiers 160, 161, 162 through separate but identical wideband filters 157, 157a, 157b. When the mode selector switch is in the E position the output signals from each mixer 131, 132, 133 is connected respectively to separate but identical narrow band filters 152, 152a, 152b and depending upon the position of the target selector switch, either respectively connected directly to an input terminal of amplifiers 160, 161, 162 or to said amplifier input terminals through separate but identical notch filters 155, 155a, 155b. When the target selector switch is in the M position (the notch filters are connected in series with the narrow band filters) as is well known in the art, signals from stationary targets will be suppressed, whereas when the target selector switch is in the A position, such signals will not be suppressed.

The contact arms 158, 158a, 158b of mode selector switch portions 106d, 106f, 106h are each connected to the signal input terminals of one of three matched amplifier sections 160, 161, 162 with self-contained gain control and which comprise a part of the aforementioned pilot-tone network. The pilot-tone network is comprised of the aforementioned three matched amplifiers 160, 161, 162, a pilot-tone oscillator 164, an amplitude compressor control amplifier 163, for providing TVG and AGC control signals, and an isolation amplifier (see FIG. 12) to prevent signal feedback through the amplitude compressor output stage. It is the function and purpose of the pilot-tone network to provide gain and phase tracking for accurate-bearing presentation in all modes of operation and compress the 90 db dynamic range of received signals by means of the TVG and AGC control voltages to the dynamic range of the video indicator. The foregoing purposes are accomplished by supplying a TVG control signal to the control input terminals of each matched amplifier section 160, 161, 162 effective to initially reduce their gain to a specific level at the time each pulse is transmitted and thereafter vary their gain recovery as a function of both time and the instantaneous level of the reverberation.

The TVG control signal is provided by the amplitude compressor control amplifier 163 which is actuated by a keying signal provided by line 139 from the keying circuit 100. Amplifier 163 is adapted to receive from the pilot-tone oscillator 164 a signal having a frequency substantially different from that of the transducer input signal and supply this signal to the matched amplifiers. The control signals to each matched amplifier differing, for example, by 25 kc. from that of the modified transducer signals, in combination with the transducer signals pass through the matched amplifier sections. However, at the output thereof a suitable filter forming a part of the matched amplifier separates the input and control signals and the input signals are supplied to wideband filters 165, 166, 167 and the control signals are supplied to and utilized by the gain control circuit to vary the amplification of the matched amplifier sections as pointed out hereinabove. The amplification factor of the matched amplifier sections vary inversely with the amplitude of the control signals from the amplitude compressor control amplifier which is additionally modified by a portion of the Omni signal at the output of filter 165 which is supplied to the amplitude compressor 163 by line 172 to provide the AGC referred to hereinbefore.

Wideband filters 165, 166, 167 connected respectively to the output terminals of one each of the matched amplifier sections 160, 161, 162 are provided with a bandpass centered at the echo-ranging oscillator frequency and have substantially the same bandwidth as identical wideband filters 157, 157a, 157b so as to pass the transducer signals but suppress noise and the TVG control signals in the matched amplifier sections. The output signals from the wideband filters 165, 166, 167 are each mixed with a portion of the beat frequency oscillator signal in mixers 168, 169, 170 to adjust the frequency of these signals to a value suitable for supplying substantial power to transistorized deflection circuits of the electromagnetic deflection cathode ray oscilloscope. If the transducer signals are initially supplied at a different frequency or different display means are used, the mixers 168, 169, 170 may obviously be omitted.

The output signals of mixers 168, 169, 170 are supplied to a small diameter cathode ray oscilloscope 171 with electromagnetic deflection. The NS directional signal from mixer 169 is supplied to the vertical deflection means, the EW directional signals from mixer 168 is supplied to the horizontal deflection means and the Omni signal from mixer 170 is supplied to the brightness control means to provide bearing sense. The connection of the Omni signal to the brightness control means is necessary since the NS and EW signal, alone will provide an ambiguous presentation, i.e., a diametral vector. Thus, as pointed out hereinbefore, the presentation of a received signal on the cathode ray oscilloscope 171 will be a radius vector extending outwardly from the center of the cathode ray tube with the presentation and orientation of the radius vector indicating the presence of a target and target bearing from true north. The ambiguous radial vector is blanked by the Omni signal. The magnitude of the radius vector increases with the strength of the received signal.

With reference now to FIG. 10 which shows the audio signal network 14 and range recorder 24 in greater detain, a portion of the Omni, NS and EW siganls from the wideband filters 165, 166, 167 are each supplied to one of three identical summing circuits 181, 182, 183. The function of summing circuits 182, 183 is to provide four cardioid directivity patterns which are utilized in the provision of a plurality of audio signals and rejection of targets concentrated in any one of four quadrants. Summing circuit 181 reproduces the Omni signal and supplies a portion thereof to summing circuit 182 which combines it with NS signal to provide Omni+NS and Omni−NS output signals indicated in FIG. 10 as O+NS and O−NS. In like manner, summing circuit 183 combines a portion of the Omni output signal of summing circuit 181 and the EW signal to provide Omni+EW and Omni−EW output signals indicated in FIG. 10 as O+EW and O−EW. The Omni+NS signal has a cardioid directivity pattern with a maximum response in the north direction and a minimum or substantially zero response in the south direction. The Omni−NS signal has a cardioid directivity pattern with a maximum response in the south direction and a minimum or substantially zero response in the north direction. The Omni+EW signal has a cardioid directivity pattern with a maximum response in the east direction and a minimum or substantially zero response in the west direction. Likewise, the Omni−EW signal has a cardioid directivity pattern with a maximum response in the west direction and a minimum or substantially zero response in the east direction.

Each of the four output terminals of summing circuits 182, 183 are connected to an input terminal of one each of the multitone mixers 184, 185, 186, 199 and to one each of the contacts of a blanked sector selector switch 187 designated as S, N, W and E. The contact arm 188 of the blanked sector selector switch 187 is connected to the blanked sector position 189 of the blanking switch 191, the other or normal position 192 of which is connected to the output terminal of summing circuit 181 and the contact arm 193 of which is connected to the signal input terminal of the sector blanking mixer 194. The blanking switch 191 in combination with the blanked sector selector switch 187 supplied the desired transducer signal to the sector blanking mixer. The mode selector switch portion 106i supplies one of three frequencies from either the audio network oscillator 195, local oscillator 107, or beat frequency oscillator 124 to the sector blanking mixer 194 where it is mixed with the incoming transducer signal to provide an output signal having a frequency which is the difference between the frequency of the input signals to the sector blanking mixer 194. The sector blanking mixer 194 is identical to the transistorized driver mixer 111. As shown in FIG. 10 with respect to the mode selector switch portion 106i the E position is connected to the audio network oscillator 195 by line 196, the L position is connected to the local oscillator 107 by line 142, the C position is connected to the beat frequency oscillator 124 by line 141, and the contact arm 197 is connected to an input terminal of the sector blanking mixer 194. The contact arm 198 of mode selector switch portion 106j is connected to the output terminal of the sector blanking mixer 194, the E position is connected to the range recorder 24, and the L and C positions are tied together and connected to the L and C positions of the mode selector switch portions 106k, 106m. The contact arms 201, 202 of mode selector switch portions 106k, 106m are connected respectively to a right audio amplifier 203 and a left audio amplifier 204 the audio output signals of which are connected to right and left earphones 205, 206. The E position of mode selector switch portions 106k, 106m are connected respectively to the output terminals of multitone mixers 184, 185 and 186, 199. A portion of the output signal of the audio network oscillator 195 is connected to input terminals of multitone mixers 184 and 186 through line 196 and a portion of the output signal of the beat frequency oscillator 124 is connected to input terminals of multitone mixers 185 and 199 through line 141.

The sector blanking mixer 194 serves as an audio mixer for passive listening and communication and also as a range recorder adapter (see FIG. 1) for adjusting the frequency of the input signal to the range recorder to fall within the frequency response of the range recorder. The signal input to the sector blanking mixer 194 is selected by the blanking switch 191 and the blanked sector selector switch 187 and the proper oscillator frequency to be mixed therewith is selected by the mode selector switch portion 106i.

It may now be readily appreciated that when the mode selector switch is in the E position the mixers 184 and 186 will provide two identical audio signals indicative of targets, for example, in either the north or south quadrant to two separate audio indicators and mixers 185 and 199 will provide two identical audio signals to the same two audio indicators. Since the audio signals from mixers 184 and 185 have a frequency different from the audio signals of mixers 186 and 199 and one of each set of signals is supplied to the same audio indicator an operator will readily be able to aurally determine the detection and approximate bearing of targets. Further, by adjustment of the blanking switch 191 and the blanked sector selector switch 187 range information of targets concentrated in any quadrant can be rejected since each cardioid pattern response selected by the blanked sector selector switch 187 has a minimum response in one each of the four quadrants. In the echo-ranging mode, range information is supplied to the range recorder 24 through the blanking switch 191, the sector blanking mixer 184, and the mode selector switch portion 106j.

Figures 11, 12:
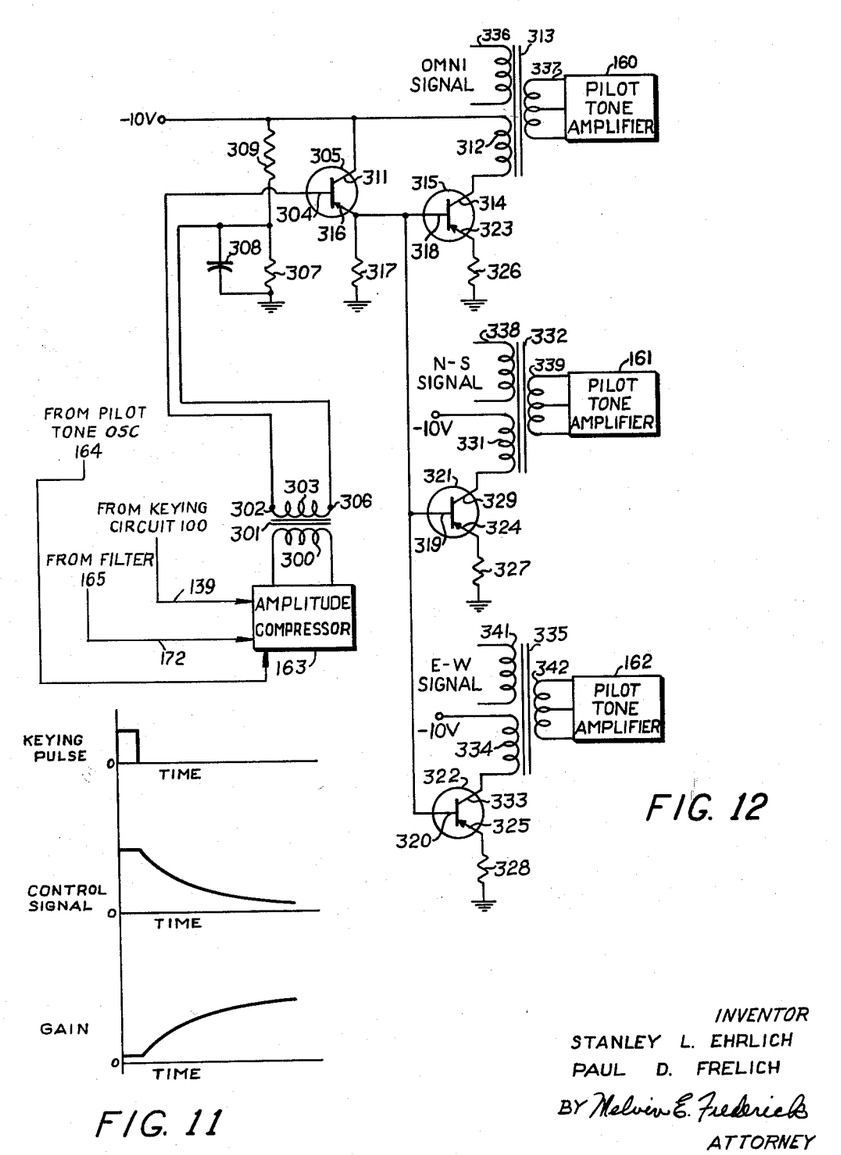
FIG. 11 is a graphic illustration showing the relation and form of the keying pulse to the control signal in, and the gain of, the pilot-tone network.
FIG. 12 is a schematic diagram of the isolation amplifier circuit in the pilot-tone network.
Figure 13:
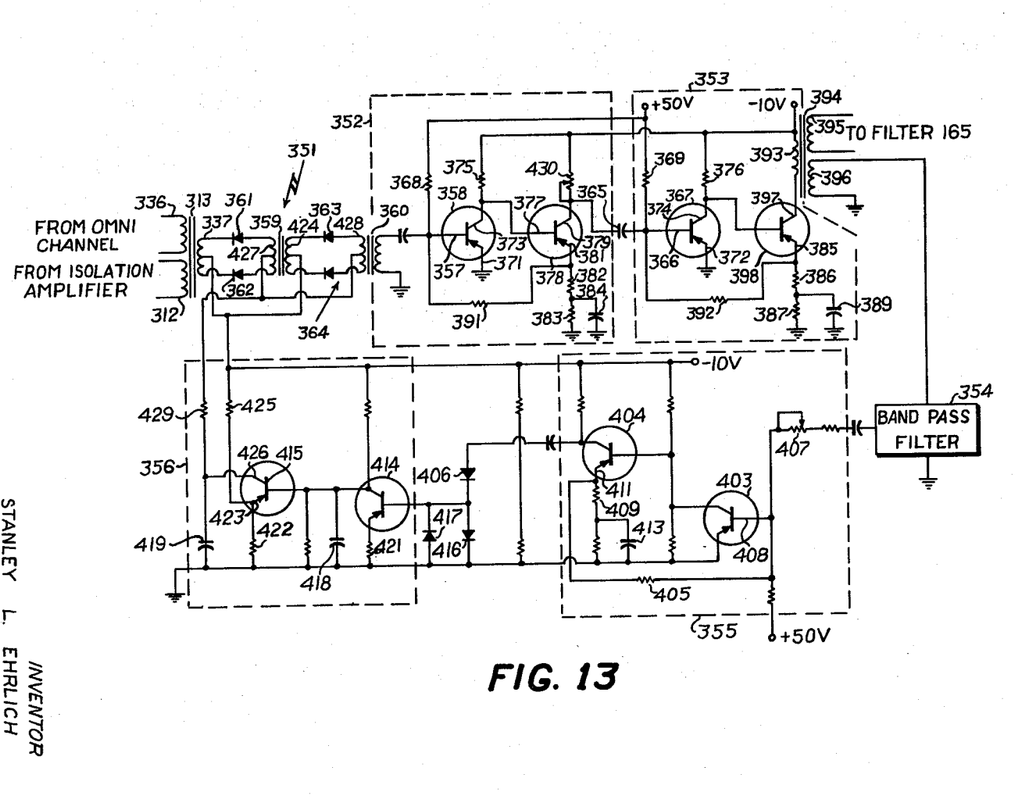
FIG. 13 is a schematic diagram of one of the identical matched amplifiers in the pilot-tone network.

FIG. 11 shows the relation of the keying pulse to the amplitude compressor 163, the output control signal from the amplitude compressor 163 for controlling the gain of the matched amplifiers 160, 161, 162, and the TVG gain characteristic of the matched amplifiers 160, 161, 162. The keying pulse supplied over line 139 actuates the amplitude compressor 163 to provide a signal of the aforementioned frequency having an amplitude that decreases in accordance with the well-known decrease of reverberation levels after transmission. As will be more thoroughly described hereinafter, the control signal from the amplitude compressor causes the gain of the matched amplifiers 160, 161, 162 to vary from a low level (at the time of maximum reverberation) to a maximum level (at the time of minimum reverberation) in accordance with the variation of the amplitude of the control signal, i.e., the level of reverberation. FIGS. 12 and 13 show in detail a schematic representation of the isolation amplifier circuit referred to hereinbefore, and one of the matched amplifiers 160, 161, 162.

With reference now to FIG. 12 which shows in schematic form the isolation amplifier circuit, the output signal of the amplitude compressor control amplifier 163 is connected to the primary winding 300 of a transformer 301, one terminal 302 of the secondary winding 303 of which is connected to the base electrode 304 of a transistor 305 and the other terminal 306 of which is connected to ground through a resistor 307 and capacitor 308 connected in parallel and to a bias voltage of, for example, −10 volts through a resistor 309. The collector electrode 311 of the transistor 305 is connected to the aforementioned bias voltage and through a winding 312 of transformer 313 to the collector electrode 314 of transistor 315. The emitter electrode 316 of transistor 305 is connected to ground through a resistor 317 and to the base electrodes 318, 319, 320 of respective transistors 315, 321, 322, emitter electrodes 323, 324, 325 are each connected to ground through respectively separate resistors 326, 327, 328. The collector electrode 329 of transistor 321 is connected to the aforementioned bias voltage through winding 331 of transformer 332, the collector electrode 333 of transistor 322 is connected to the bias voltage through winding 334, of transformer 335, and in like manner the collector electrode 314 of transistor 315 is connected to the bias voltage through winding 312 of transformer 313. The Omni signal from mode selector switch 106d is connected to winding 336 of transformer 313 the secondary winding 337 of which comprises a portion of the input network to amplifier 160; the NS signal from mode selector switch 106f is connected to winding 338 of transformer 332 the secondary winding 339 of which comprises a portion of the input network to amplifier 161; and the EW signal from mode selector switch 106h is connected to the winding 341 of transformer 335 the secondary winding 342 of which comprises a portion of the input network to amplifier 162.

The amount of isolation provided by parallel connected transistors 315, 321, 322 is determined by the collector impedances of these transistors in relation to the impedances of the source (transistor 305) connected to their base circuits. To keep this source impedance low, a grounded collector stage is used to drive the three parallel amplifiers. If the output impedance is approximately 50 ohms and the collector impedance is approximately 200,000 ohms the amount of isolation between the amplifiers will be approximately 72 db.

The drive from the isolation amplifiers behaves as a current source because the collector impedance of the transistors is very high. The portion of contributions from the reference signal and from the input signal to each amplifier 160, 161, 162 will be constant, provided that the impedance of the voltage source driving the signal input windings 336, 338, 341 of transformer 313, 332, 335 is constant. The impedance of the aforementioned voltage source is determined by the output impedance of the filters in the preceding stage.

To facilitate description of the matched amplifiers of the pilot-tone circuit only one is shown and will be described in connection with the Omni signal from the mode selector switch portion 106d. It is to be understood, however, that this description is directly applicable to the amplification of the NS and EW signal with the exception that the NS and EW signals are supplied to the signal input winding and the output winding is connected to different bandpass filters.

With reference now to FIG. 13 which shows in schematic form one of the identical matched amplifiers 160, 161, 162 shown in block form in FIG. 9, the contact arm 158 of mode selector switch portion 106d is connected to the winding 336 and a portion of the control signal from the pilot-tone isolation amplifier shown in FIG. 12 is connected to winding 312 and these signals are coupled to the center tapped secondary winding 337 of transformer 313, all as pointed out hereinbefore. Each matched amplifier is comprised of an input network 351; two feedback transistorized amplifier sections 352, 353 each having two stages of amplification for providing 90 db of current gain; a bandpass filter 354 the center frequency of which corresponds to the frequency of oscillator 164; a two stage transistorized A.C. amplifier section 355 with feedback; and a two stage transistorized D.C. amplifier section 356.

The input, control, and AGC signals are coupled to the base electrode 357 of transistor 358 through the input network 351 comprising transformers 313, 359, 360, two diodes 361, 362 connected between transformers 313 and 359, and two diodes 363, 364 connected between transformers 359 and 360 as shown in FIG. 13. Each amplifier section 352, 353 comprises a pair of D.C. coupled transistors with feedback. Amplifier sections 352, 353 are capacitively coupled by capacitor 365 and a large amount of feedback is provided in each section to maintain phase shift variations at a minimum. The base electrodes 357, 366 of transistors 358, 367 are connected respectively through resistors 368, 369 to a positive voltage supply of, for example, about 50 volts. The emitter electrodes 371, 372 of transistors 358, 367 are connected directly to ground and the collector electrodes 373, 374 thereof are connected through suitable resistors 375, 376 to a negative bias voltage of, for example, about −10 volts. The base electrode 377 of transistor 378 is connected directly to the collector electrode 373 of transistor 358 and the base electrode 366 of transistor 367 is connected through capacitor 365 to the collector electrode 379 of transistor 378. Emitter electrode 381 is connected to ground through resistor 382 in series with the parallel combination of resistor 383 and capacitor 384. Emitter electrode 385 of transistor 398 is connected to ground through resistor 386 in series with the parallel combination of resistor 387 and capacitor 389. Feedback in each section 352, 353 is supplied through equal resistors 391, 392.

The primary winding 393 of an output transformer 394 having two secondary windings 395, 396 is connected to the collector electrode 397 of transistor 398. Secondary winding 395 supplies a portion of the output signal to wideband filter 165 and the other secondary winding 396 supplies a portion of the output signal to the bandpass filter 354 the function of which is to pass the control signal frequency only and block the input signal frequency. Wide band filter 165, on the other hand, passes the input signal frequency and blocks the control signal frequency. The internal feedback circuit comprises two amplifier sections 355, 356. Section 355 comprising transistors 403, 404, functions as an A.C. amplifier with considerable feedback through resistor 405 to stabilize gain and receives the control signal from the bandpass filter 354, amplifies it and applies the resultant A.C. signal to a voltage regulator diode 406 which determines the control signal reference level in the internal feedback circuit. No signal will pass through diode 406 until the peak-to-peak voltage applied across it exceeds its breakdown voltage. When this occurs the resultant pulses of current are first rectified and then amplified by the second section 356 which controls the bias current through the gain control diodes in the input network 351. It is preferred that the control signal at winding 396 be maintained at a constant level of, for example, 2.5 volts R.M.S. The relationship between this value and the reference level set by the voltage regulator diode may be adjusted by varying the variable resistor 407 in series with the input to the base electrode 408 of transistor 403. The current gain is determined by feedback resistor 405 and the resistance of resistor 409 connected between the emitter electrode 411 and the parallel combination of resistor 412 and capacitor 413 connected to ground. Direct coupling of the transistors 358, 378; 367, 398; 403, 404; and 414, 415 has the advantage of minimizing changes of operating point due to leakage current and eliminates the necessity of coupling circuits.

The current which passes through the voltage regulator diode 406 is rectified by oppositely connected diodes 416, 417. The negative half-waves of voltage appearing across diodes 416, 417 are amplified by transistor 414 and the resultant D.C. current obtained therefrom is smoothed by capacitor 418 in the collector circuit of transistor 414. Transistor 415 which is directly coupled to transistor 414 amplifies this D.C. current to control the current flowing through the four gain control diodes 361, 362, 363, 364 and an additional smoothing capacitor 419 is connected in the collector circuit of transistor 415. Resistors 421, 422 are connected in the emitter circuits of transistors 414, 415 to provide feedback for stabilizing the gain and operating points of these two stages. The emitter electrode 423 of transistor 415 is connected to the center tap of windings 337, 424 through a resistor 425 and the collector electrode 426 of transistor 415 is connected to the center taps of windings 427, 428 through resistor 429.

The Omni (or NS or EW) and control signals are separately amplified by sections 352, 353 and are separated at the output by filters 165, 354. The control signal processed in the manner hereinbefore described is fed back to the input of section 352 and is used to control gain. If the amplitude of the control signal at the input to section 352 is high, a large amount of feedback will be provided to reduce the gain through sections 352, 353. The gain of the matched amplifiers are matched by adjustment of the variable resistor 430 in the collector circuit of transistor 378.

Figure 14:
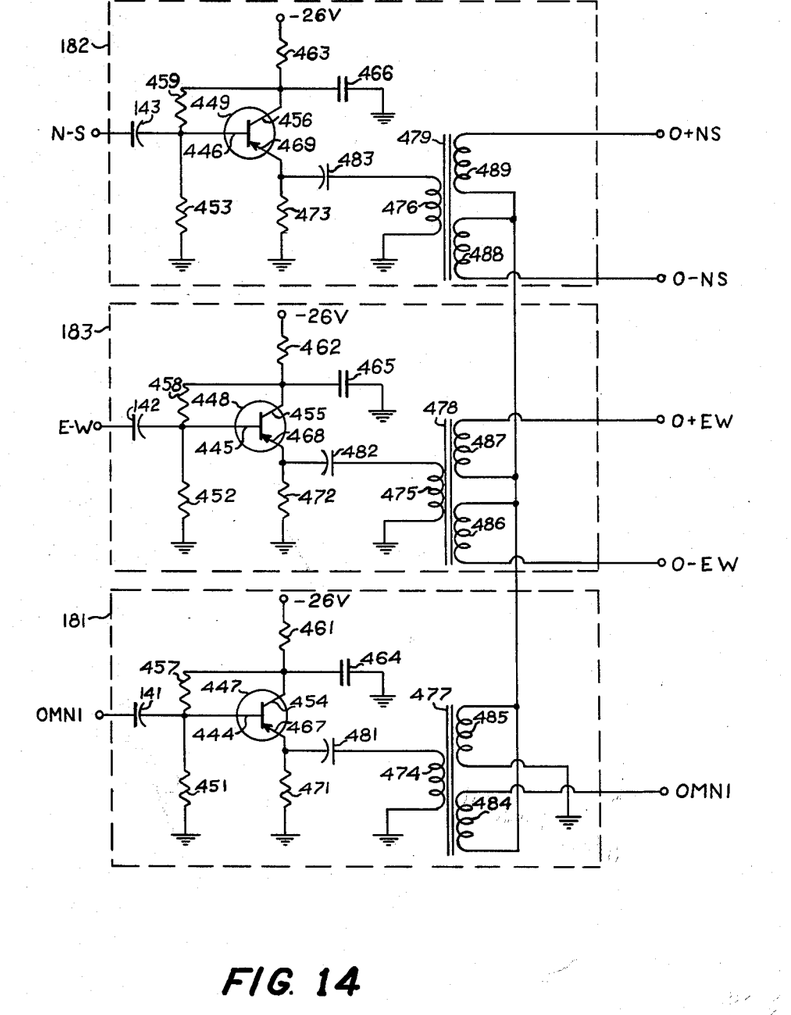
FIG. 14 is a schematic diagram of the summing circuits.

FIG. 14 shows in detail in schematic form summing circuits 181, 182, 183 shown in block form in FIG. 10. The Omni, NS, and EW signals from wideband filters 165, 166, 167 are each supplied respectively through identical coupling capacitors 141, 143, 142 to the base electrodes 444, 446, 445 of identical transistor circuits. The aforementioned base electrodes of each transistor 447, 448, 449 are respectively connected to ground through resistors 451, 453, 452 and to the collector electrodes 454, 456, 455 through resistors 457, 459, 458. The collector electrodes 454, 455, 456 are each connected through resistors 461, 462, 463 to a negative bias voltage of, for example, −26 volts and to ground through capacitors 464, 465, 466. The emitter electrodes 467, 468, 469 are respectively connected to ground through resistors 471, 472, 473 and to the primary windings 474, 475, 476 of transformers 477, 478, 479 through capacitors 481, 482, 483. The secondary of transformer 477 comprises two windings 484, 485 connected in series aiding whereby the Omni input signal is reproduced and a portion thereof is supplied to the windings 486, 487 comprising the secondary of transformer 478 and to the windings 488, 489 comprising the secondary of transformer 479. Windings 486, 487 and 488, 489 are connected in series opposing and as mentioned hereinabove, to the secondary windings of the output transformer 477 for the Omni signal. Due to the connection of the secondary windings are described hereinabove the output signal from winding 489 will, for example, comprise the cardioid $O+NS$ signal, the output signal from winding 488 will comprise the cardioid $O-NS$ signal, the output signal from winding 487 will comprise the cardioid $O+EW$ signal, and the output signal from winding 486 will comprise the cardioid O−EW signal. The aforementioned signals from the summing circuits are utilized in the manner hereinbefore described in relation to the discussion of FIG. 10. It has been found that the output sums of the summing circuits will track in phase within about 0.2 degree with a phase shift of about 3.6 degrees and a maximum signal level of about 1.5 volts R.M.S.

While the present invention has been described in its preferred embodiment, it is realized that modifications may be made, and it is desired that it be understood that no limitations on the invention are intended other than may be imposed by the scope of the appended claims.

What is claimed is:

1. In an underwater detection system the combination comprising: a transducer having two dipole patterns with mutually substantially perpendicular axes and an omnidirectional pattern; broad band phase shift means for phase shifting electrical signals provided by said omnidirectional pattern by 90 degrees; compass means having an output signal proportional to true north; means actuated by said compass output signal for resolving electrical signals provided by each said dipole pattern to respectively NS and EW true-bearing form; three amplifier circuits for receiving respectively said NS and EW signals and said phase shifted signal, the response of said amplifiers being substantially equal one with another; means connected to the input of said amplifiers effective to vary the gain thereof and provide a high and substantially equal flatness factor for each said amplifier and including a feedback circuit responsive to the output of said amplifier amplifying the phase shifted signal; a cathode ray oscilloscope having a screen, brightness control means, and vertical and horizontal beam deflection means; means for applying said amplified NS signal to said vertical deflection means; means for applying said amplified EW signal to said horizontal deflection means; and means for applying said amplified omnidirectional signal to said brightness control means to produce on said screen indications of the bearing of a target relative to true north.

2. In an underwater detection system the combination comprising: a transducer having two dipole patterns with mutually substantially perpendicular axes and an omnidirectional pattern; broad band phase shift means for phase shifting electrical signals provided by said omnidirectional pattern by 90 degrees; compass means having an output signal proportional to true north; means actuated by said compass output signal for resolving electrical signals provided by each said dipole pattern to respectively NS and EW true-bearing form; three amplifier circuits for receiving respectively said NS and EW signals and said phase shifted signal; gain control means connected between the output of said omnidirectional amplifier circuit and the input of each said amplifier circuit for maintaining the response of said amplifier substantially equal one with another and for providing a high and substantially equal flatness factor for each said amplifier; a cathode ray oscilloscope having a screen, brightness control means, and vertical and horizontal beam deflection means; means for applying said amplified NS signal to said vertical deflection means; means for applying said amplified EW signal to said horizontal deflection means; and means for applying said amplified omnidirectional signal to said brightness control means to produce on said screen indications of the bearing of a target relative to true north.

3. In an underwater detection system the combination comprising: a transducer having two dipole patterns with mutually substantially perpendicular axes and an omnidirectional pattern; broad band phase shift means for delaying in phase electrical signals provided by said omnidirectional pattern by 90 degrees; a gyro compass carried by said transducer and having an output signal proportional to true north; means actuated by said compass output signal for receiving and resolving electrical signals provided by each said dipole pattern to respectively NS and EW true-bearing form; three matched amplifier circuits for receiving respectively said NS and EW signals and said phase shifted signal, the response of said amplifiers being substantially equal one with another; feedback means responsive only to the output of said amplifier circuit which receives said phase shifted signal connected to the input of each of said amplifiers for providing a time varied gain control signal; matched feedback means connected between the input and output of each of said amplifiers responsive to said gain control signal for varying the gain of each said amplifier in accordance with variations of said gain control signal and for providing a high and substantially equal flatness factor for each said amplifier; a cathode ray oscilloscope having a screen, brightness control means, and vertical and horizontal beam deflection means; means for applying said amplified NS signal to said vertical deflection means; means for applying said amplified EW signal to said horizontal deflection means; and means for applying said amplified omnidirectional signal to said brightness control means to produce on said screen indications of the bearing of a target relative to true north.

4. In an underwater detection system the combination comprising: a transducer having two dipole patterns with mutually substantially perpendicular axes and an omnidirectional pattern; broad band phase shift means for phase shifting electrical signals provided by said omnidirectional pattern by 90 degrees; compass means having an output signal proportional to true north; means actuated by said compass output signal for resolving electrical signals provided by each said dipole pattern to respectively NS and EW true-bearing form; three amplifier circuits for receiving respectively said NS and EW signals and said phase shifted signal; gain control means connected between the output terminal of said omnidirectional amplifier circuit and the input of each of said amplifiers for maintaining the response of said amplifiers substantially equal one with another and for providing a high and substantially equal flatness factor for each said amplifier; means responsive to said amplifier signals to produce four signals having a cardioid variation, each said signal having a maximum value in a different one of the cardinal compass directions; loudspeaker means, means responsive to said cardioid varying signals for energizing said loudspeaker means to produce audible signals indicative of the bearing of a target; a cathode ray oscilloscope having a screen, brightness control means, and vertical and horizontal beam deflection means; means for applying said amplified NS signal to said vertical deflection means; means for applying said amplified EW signal to said horizontal deflection means; and means for applying said amplified omnidirectional signal to said brightness control means to produce on said screen indications of the bearing of the target relative to true north.

5. In an underwater detection system for dirigible vehicles the combination comprising: a transducer adapted to be freely suspended beneath said vehicle and having two dipole patterns with mutually substantially perpendicular axes and an omnidirectional pattern; broad band phase shift means for phase shifting electrical signals provided by said omnidirectional pattern by 90 degrees; a gyro compass, said compass being oriented with respect to and supported by said transducer and having an output signal proportional to true north; means actuated by said compass output signal for receiving and resolving electrical signals provided by each said dipole pattern to respectively NS and EW true-bearing form; filter circuits for receiving respectively said NS, EW, and phase shifted signals, each said filter circuit being substantially identical one with another and including a narrow band filter, a notch filter and switching means for selectively connecting said notch filter in series with said narrow band filter whereby when said notch filter is connected in series with said narrow band filter stationary targets will not be detected and all targets will be detected when said notch filter is not connected in series with said narrow band filter; three matched amplifier circuits for receiving respectively said NS and EW signals and said phase shifted signal from said filter circuits, the response of said amplifiers being substantially equal one with another; feedback means responsive to the output of said amplifier for amplifying said phase shifted signal connected to the input of each of said amplifiers for providing time varied gain control signal; matched feedback means connected between the input and output of each said amplifier responsive to said gain control signal for varying the gain of each said amplifier in accordance with variations of said gain control signal and for providing a high and substantially equal flatness factor for each said amplifier; a cathode ray oscilloscope having a screen, brightness control means, and vertical and horizontal beam deflection means; means for applying said amplified NS signal to said vertical deflection means; means for applying said amplifier EW signal to said horizontal deflection means; and means for applying said amplified omnidirectional signal to said brightness control means to produce on said screen indications of the bearing of a target relative to true north.

6. In an underwater transmission-reception system the combination comprising: a transducer for imparting energy into the water and receiving an echo from a target located therein, said transducer having two dipole patterns with mutually substantially perpendicular axes and an omnidirectional pattern; a keying circuit for providing timing pulses; signal generating means connected to said transducer responsive to said keying circuit for actuating said transducer; broad band phase shift means for receiving and phase shifting electrical signals provided by said omnidirectional pattern by 90 degrees; compass means associated with said transducer having an output signal proportional to true north; means actuated by said compass output signal for receiving and resolving electrical signals provided by each said dipole pattern to respectively NS and EW true-bearing form; three matched amplifier circuits for receiving respectively said NS and EW signals and said phase shifted signal; time varied gain control means responsive to said keying circuit connected to the input of said amplifiers for providing a high and substantially equal flatness factor for each said amplifiers and including a feedback circuit from the output of said amplifier for receiving said phase shifted signal to the input of said three matched amplifiers; a cathode ray oscilloscope having a screen, brightness control means, and vertical and horizontal beam deflection means; means for applying said amplified NS signal to said vertical deflection means; means for applying said amplified EW signal to said horizontal deflection means; and means for applying said amplified omnidirectional signal to said brightness control means to produce on said screen indications of the bearing of a target relative to true north.

7. In an underwater transmission-reception system the combination comprising: a transducer for imparting energy into the water and receiving an echo from a target located therein, said transducer having two dipole patterns with mutually substantially perpendicular axes and an omnidirectional pattern; a keying circuit for providing timing pulses; signal generating means connected to said transducer responsive to said keying circuit for actuating said transducer; broad band phase shift means for receiving and phase shifting electrical signals provided by said omnidirectional pattern by 90 degrees; a gyro compass carried by said transducer having an output signal proportional to true north; means actuated by said compass output signal for receiving and resolving electrical signals provided by each said dipole pattern to respectively NS and EW true-bearing form; three amplifier circuits the responses of which are substantially equal one with another for receiving respectively said NS and EW signals and said phase shifted signal; gain control means including an amplitude compressor control circuit responsive to said keying circuit and connected to the input of each said amplifier for providing a time varied gain control signal and matched feedback circuits responsive to said gain control signal connected to the input and output of each said amplifier for providing a high and substantially equal flatness factor for each said amplifier; a cathode ray oscilloscope having a screen, brightness control means, and vertical and horizontal beam deflection means; means for applying said amplified NS signal to said vertical deflection means; means for applying said amplified EW signal to said horizontal deflection means; and means for applying said amplified omnidirectional signal to said brightness control means to produce on said screen indications of the bearing of a target relative to true north.

8. In an underwater transmission-reception system the combination comprising: a transducer for imparting energy into the water and receiving an echo from a target located therein, said transducer having two dipole patterns with mutually substantially perpendicular axes and an omnidirectional pattern; a keying circuit for providing timing pulses; signal generating means responsive to said keying circuit for actuating said transducer; means coupling said signal generating means to said transducer; broad band phase shift means for phase shifting electrical signals provided by said omnidirectional pattern by 90 degrees; compass means associated with said transducer having an output signal proportional to true north; means actuated by said compass output signal for receiving and resolving electrical signals provided by each said dipole pattern to respectively NS and EW true-bearing form; three amplifier circuits for receiving respectively said NS and EW signals and said phase shifted signal; gain control means including an amplitude compressor control circuit responsive to said keying circuit and connected to the input of each said amplifier for providing a time varied gain control signal and matched feedback circuits responsive to said gain control signal connected to the input and output of each said amplifier for providing a high and substantially equal flatness factor for each said amplifier; means responsive to said amplified signals to produce four signals having a cardioid variation, each said signal having a maximum value in a different one of the cardinal compass directions; loudspeaker means; means responsive to said cardioid varying signals for energizing said loudspeaker means to produce audible signals indicative of the bearing of a target; a cathode ray oscilloscope having a screen, brightness control means, and vertical and horizontal beam deflection means; means for applying said amplified NS signal to said vertical deflection means; means for applying said amplified EW signal to said horizontal deflection means and means for applying said amplified omnidirectional signal to said brightness control means to produce on said screen indications of the bearing of a target relative to true north.

9. The combination as defined in claim 8 wherein said gain control means additionally includes an oscillator connected to said amplitude compressor circuit for providing a gain control signal frequency different from that of said NS, EW, and phase shifted signals; and a filter connected between each amplifier output and the input of its respective feedback circuit adapted to pass only said gain control signal.

10. The combination as defined in claim 8 wherein said means for forming said cardioid signals comprises a first summing circuit for combining a portion of said amplified NS signal with a portion of said amplified phase shifted signal to provide two signals having a cardioid variation the maximum values of which correspond respectively to due north and due south; and a second summing circuit for combining a portion of said amplified EW signal with a portion of said amplified phase shifted signal to provide two signals having a cardioid variation the maximum values of which correspond respectively to due east and due west.

11. The combination as defined in claim 10 and additionally including means for selectively applying a portion of the output of said first and second summing circuits to said loudspeaker means for suppressing signals indicative of targets in any one of four quadrants.

12. A detection system comprising means for transmitting a substantially omnidirectional pattern of pulses of wave energy, a plurality of transducer means each for detecting echoes of said wave energy from different azimuthal directions, compass means, a plurality of different channels, means for combining in each of said channels echo signals detected at all of said transducers producing in a first channel a signal whose phase represents one of a first pair of opposite directions, producing in a second channel a signal whose phase represents one of a second pair of opposite directions, and producing in a third channel a signal whose magnitude is representative of the strength of the echo; a display device, resolver means in said first and second channels driven by said compass means and means coupling said signals in each of said channels to the active parts of said display device.

13. A detection system comprising means for transmitting a substantially omnidirectional pattern of pulses of wave energy, a plurality of transducer means each for detecting echoes of said wave energy from different azimuthal directions, compass means, a plurality of different channels, means for combining in each of said channels echo signals detected at all of said transducers producing in a first channel a signal whose phase represents one of a first pair of opposite directions, and producing in a second channel a signal whose phase represents one of a second pair of opposite directions which are transverse to the first-mentioned pair of opposite directions, and producing in a third channel a signal whose magnitude is representative of the strength of the echo; resolver means in said first and second channels driven by said compass means, a cathode ray tube display device, means coupling said signals in said first and second channels to said display device to control beam position and means coupling said third channel to said display device to control beam intensity.

14. A detection system comprising means for transmitting a substantially omnidirectional pattern of pulses of wave energy, a plurality of transducer means each for detecting echoes of said wave energy from different azimuthal directions, compass means, a plurality of different channels, means for combining in each of said channels echo signals detected at all of said transducers producing in a first channel a signal whose phase represents one of a first pair of opposite directions, and producing in a second channel a signal whose phase represents one of a second pair of opposite directions which are perpendicular to the first-mentioned pair of opposite directions, and producing in a third channel a signal whose magnitude is representative of the strength of the echo; resolver means in said first and second channels driven by said compass means for altering phase of signals in said first and second channels to represent north or south directions and signals in said second channel to represent east or west directions, cathode ray tube display means, and means coupling said signals in said channels to said display means.

15. In a pulse-operated detection system including a pulsed transmitter and a return-pulse receiver responsive to changes of a gain control signal and adapted to amplify echo signals from objects at different ranges from the system, the combination comprising: an amplifier; signal generating means for providing a gain control signal having a frequency different from that of said echo signals; means for receiving and varying the amplitude of said gain control signal in a predetermined manner; means for applying said echo signals and said variable gain control signal to said amplifier including a first transformer having a first output winding and first and second input windings for receiving respectively said echo signals and said gain control signal, a second transformer having a third input winding and a second output winding, a pair of diodes connecting said first output winding and said third input winding to form a series circuit, a third transformer having a fourth input winding and a third output winding, a pair of diodes connecting said second output winding and said fourth input winding to form a series circuit, and means for applying said bias signal intermediate the ends of said third and fourth input windings; filter means connected to the output of said amplifier for receiving a portion of the output of said amplifier and passing said gain control signal only; means including a rectifier connected between the output of said filter means and the input of said amplifier for providing a bias signal for controlling the gain of said amplifier; and means for actuating said amplitude varying means in synchronism with transmitted pulses whereby the gain of said amplifier is progressively increased from an initial value to a final value during substantially the entire period of time included in each interval between successive transmitted pulses.

References Cited by the Examiner

UNITED STATES PATENTS

| | | | |
|---|---|---|---|
| 2,279,031 | 4/42 | Cockerell et al. | 343—107 |
| 2,405,604 | 8/46 | Pope | 340—6 |
| 2,407,242 | 9/46 | Batchelder | 340—6 |
| 2,488,371 | 11/49 | Bollman et al. | 340—3 |
| 2,515,154 | 7/50 | Lamphier | 340—11 |
| 2,529,658 | 11/50 | Massa | 340—6 |
| 2,594,916 | 4/52 | Gulnac | 343—11 |
| 2,723,387 | 11/55 | Slavin | 340—15.5 |
| 2,724,099 | 11/55 | Harrison | 340—3 |
| 2,754,493 | 7/56 | Lippel | 340—3 |
| 2,760,181 | 8/56 | Camp | 340—10 |
| 2,768,364 | 10/56 | Camp | 340—9 |
| 2,798,949 | 7/57 | Scholz | 343—5 |
| 2,838,850 | 6/58 | Stephenson et al. | 340—3 X |
| 2,867,788 | 1/59 | Harry | 340—3 |
| 2,921,288 | 1/60 | O'Neill et al. | 340—5 |
| 2,948,579 | 8/60 | Baecher | 340—3 |
| 2,961,636 | 11/60 | Benecke | 340—6 |
| 2,963,681 | 12/60 | Morgan | 340—6 |
| 2,965,879 | 12/60 | Lippel | 340—6 |
| 2,977,588 | 3/61 | Korman | 343—119 |
| 2,982,919 | 5/61 | Montgomery | 330—137 |
| 3,051,927 | 8/62 | Mazzagatti | 340—10 |
| 3,083,341 | 3/63 | White et al. | 330—137 X |

CHESTER L. JUSTUS, *Primary Examiner.*

KATHERINE H. CLAFFY, *Examiner.*